(12) United States Patent
Nagarathnam et al.

(10) Patent No.: US 11,477,661 B2
(45) Date of Patent: Oct. 18, 2022

(54) ELECTRONIC APPARATUS AND METHOD FOR DYNAMICALLY SELECTING A WI-FI AND BLUETOOTH COEXISTENCE MODE BASED ON PACKET STATISTICS, SIGNAL CONDITION, AND APPLICATION CHARACTERISTICS

(71) Applicant: ARRIS Enterprises LLC, Suwanee, GA (US)

(72) Inventors: Yuvaraj Nagarathnam, Bangalore (IN); Senthil Kumar, Bangalore (IN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 57 days.

(21) Appl. No.: 17/136,392

(22) Filed: Dec. 29, 2020

(65) Prior Publication Data

US 2021/0204141 A1    Jul. 1, 2021

Related U.S. Application Data

(60) Provisional application No. 62/955,540, filed on Dec. 31, 2019.

(51) Int. Cl.
*H04W 16/14*   (2009.01)
*H04W 72/10*   (2009.01)
(Continued)

(52) U.S. Cl.
CPC .............. *H04W 16/14* (2013.01); *H04B 1/58* (2013.01); *H04W 72/0446* (2013.01); *H04W 72/085* (2013.01); *H04W 72/10* (2013.01)

(58) Field of Classification Search
CPC ............. H04W 16/14; H04W 72/0446; H04W 72/085; H04W 72/10; H04B 1/58
See application file for complete search history.

(56) References Cited

U.S. PATENT DOCUMENTS 8,831,655 B2   9/2014  Burchill et al.
2013/0028201 A1  1/2013  Koo et al.
(Continued)

FOREIGN PATENT DOCUMENTS

WO    2019/010049    1/2019

OTHER PUBLICATIONS

International Search Report and the Written Opinion of the International Searching Authority dated Jun. 15, 2021 in International (PCT) Application No. PCT/US2020/067296.

*Primary Examiner* — Brian P Cox
(74) *Attorney, Agent, or Firm* — Wenderoth, Lind & Ponack, L.L.P.

(57) ABSTRACT

An electronic apparatus and a method for determining which of a plurality of coexistence modes to execute with a processor. The processor selectively runs one or more applications. Each coexistence mode when executed enables coexistence of wireless communication according to first and second wireless communication protocols. The processor executes a program so as to: measure wireless signal conditions of signals received with the first and second wireless communication protocols, respectively; determine packet statistics of communication packets received with the first and second wireless communication protocols, respectively; obtain, for each application being run by the processor, an application performance indication, an application first communication protocol setting; and an application second communication protocol setting; determine which one of the coexistence modes to execute based on the wireless signal conditions, the packet statistics, the application performance indication, application first communication protocol setting; and the application second communication protocol setting.

19 Claims, 7 Drawing Sheets

(51) Int. Cl.
*H04W 72/08* (2009.01)
*H04B 1/58* (2006.01)
*H04W 72/04* (2009.01)

(56) References Cited

U.S. PATENT DOCUMENTS

| | | |
|---|---|---|
| 2015/0133185 A1 | 5/2015 | Chen et al. |
| 2015/0381291 A1* | 12/2015 | Mahajan ............... H04W 16/14 370/252 |
| 2016/0262056 A1 | 9/2016 | Chen et al. |
| 2017/0086251 A1* | 3/2017 | Valliappan ............ H04L 43/106 |

* cited by examiner

ELECTRONIC APPARATUS AND METHOD FOR DYNAMICALLY SELECTING A WI-FI AND BLUETOOTH COEXISTENCE MODE BASED ON PACKET STATISTICS, SIGNAL CONDITION, AND APPLICATION CHARACTERISTICS

BACKGROUND

Bluetooth and Wi-Fi use the same 2.4 GHz band. Therefore, when both Bluetooth (BT) and Wi-Fi communications occur in the same location at the same time, they can act as interferers to one another. More and more products are starting to use Bluetooth and Wi-Fi together. Traditional set top boxes use BT for BT remote control operation and audio transmission. As set top box technology converges with Internet of Things (IOT) technology, set top boxes will take on additional roles such as IOT hub (smart home hub) and the need for BT in such a device is inevitable. As the requirement for Bluetooth devices increases (as is the case with IOT and other smart technologies, e.g., BT watch, BT fitness band, BT sensors, wireless switches, etc.), usage of the 2.4 GHz ISM band by BT will increase and this will affect Wi-Fi performance. A major problem solved herein is a way for an electronic apparatus having both Bluetooth and Wi-Fi to dynamically choose the best Bluetooth and Wi-Fi co-existence scheme.

Choosing a coexistence scheme statically does not give the best performance as signal conditions (channel conditions), and application needs, keeps changing with time. Thus, many applications (devices, electronic apparatuses) can implement methods disclosed herein to attain the best performance.

Accordingly, there is a necessity to implement Bluetooth (BT)/Wi-Fi co-existence techniques in order to allow Bluetooth and Wi-Fi to be used in the same location. BT/Wi-Fi co-existence can be achieved by several techniques such as spatial separation, time division multiplexing, and adaptive frequency hopping.

In an electronic apparatus that includes both Bluetooth and Wi-Fi, a spatial separation technique can achieve BT/Wi-Fi co-existence by designing and locating antennas, or designing the antenna patterns, in the apparatus in such a way that the Bluetooth antenna and the Wi-Fi antenna are spatially separated and there is enough isolation between them, e.g., a minimum of 40 dB isolation. For example, the Bluetooth antenna can be located at one end of the electronic device, the Wi-Fi antenna placed at the other opposite end, and, optionally, shielding can be placed at a location between the two antennas.

Time division multiplexing can be utilized to achieve BT/Wi-Fi coexistence by operating the Bluetooth and Wi-Fi communications at different times, such as by interleaving the use times of the Bluetooth and Wi-Fi, so as to time share the same radio frequency space. For example, a processor on board the apparatus can control the times at which the Bluetooth and Wi-Fi communications are transmitted.

With AFH (Adaptive Frequency Hopping) techniques, the processor effects rapid change of the particular frequency on which the Bluetooth communication occurs, such that the processor avoids implementing Bluetooth communication on channels where Wi-Fi interference exists or is higher than a predetermined amount, by selecting channels for frequency hopping that do not interfere with Wi-Fi communication. Bluetooth Devices are radio frequency devices designed to use the 2.4 to 2.48 GHz frequency band known as the ISM band. Bluetooth devices share this band with other devices such as wireless networks (IEEE 802.11) and cordless phones.

Bluetooth devices use frequency hopping to help minimize the effects of interference with other devices. In implementing the frequency hopping technique, a link between the communicating devices is formed such that the devices are synchronized to change channels together many times per second. The pattern of channels used is called the hop sequence and is unique for each link. Since the devices spend only small amounts of time on a particular channel, and because the hop sequence is different for each link, the possibility of interference is minimized. Moreover, from Bluetooth Revision 1.2 onwards, devices also use AFH, an adaptive form of frequency hopping that tries to reduce interference further by adapting the hop sequence to avoid channels in use by other devices operating in the same ISM band. The adaptive concept of AFH is that the Bluetooth device actually looks at what channels are already heavily in use and avoids those channels in the hop sequence. Using this technique BT can avoid the channel frequencies used by Wi-Fi and thus BT and Wi-Fi apparatuses existing in the same device can communicate on frequencies that do not overlap and thus do not affect each other.

A known method includes selection of a co-existence profile based on Wi-Fi RSSI (Received Signal Strength Indicator) and/or Bluetooth RSSI; and the number of BT and Wi-Fi devices that the device is communicating with. Such method includes storing a plurality of coexistence profiles for different communication scenarios; initializing a device with default coexistence profiles; dynamically selecting different coexistence profiles based on current communication conditions; and configuring the device based on the selected communication profile. The coexistence profile can be changed dynamically, by monitoring the above mentioned parameters and can be changed at interval of 1 ms/1 sec. However, such a known method does not use the actual packet statistics of the received and transmitted data and the configuration and/or needs of the application to make the decision.

RSSI is not a representation of signal quality of the received signal, but it only gives the signal strength. Signal to noise ratio (SNR) can be low even with RSSI being high, and thus the received data integrity can be compromised even with a high RSSI. Methods relying primarily on RSSI do not take this into account. Therefore, the basic criteria for making the decision is not accurate which will lead to the wrong mode being selected and the performance being compromised.

SUMMARY

Rather than relying generally on signal strength per se, or even RSSI specifically, the electronic apparatuses disclosed herein execute a dynamic BT/Wi-Fi coexistence mode selection process in which signal parameters, other than mere signal strength, are detected and analyzed in order to determine the channel conditions on which a determination is made as to which one of plural BT/Wi-Fi coexistence modes is selected. Specifically, for example, RF signal diagnostics and/or packet statistics are detected and analyzed. Moreover, in addition to such signal parameters, the application type and communication requirements can be taken into account in the dynamic BT/Wi-Fi coexistence mode selection process. Such an electronic apparatus as disclosed herein provides advantageous effects, such as Bluetooth and Wi-Fi data transmission efficiency being increased with reduced loss of data, resulting in improved users experience. By using more accurate parameters for analyzing and inferring the channel conditions, a more accurate co-ex mode can be selected.

A first aspect is an electronic apparatus including one or more antennas; a first wireless communication circuit that effects wireless communication according to a first communication protocol over one of the one or more antennas; a second wireless communication circuit that effects wireless communication according to a second communication protocol over one of the one or more antennas; a memory having a program, and coding for plural coexistence modes stored therein, each coexistence mode when executed enabling coexistence of wireless communication according to the first and second wireless communication protocols by the first and second wireless communication circuits; a processor that runs one or more applications, and executes the program so as to: measure wireless signal conditions of signals received with the first and second wireless communication circuits, respectively; determine packet statistics of communication packets received with the first and second wireless communication circuits; obtain, for each application being run by the processor, an application performance indication, an application first communication protocol setting; and an application second communication protocol setting; determine which one of the coexistence modes to execute based on the wireless signal conditions, the packet statistics, the application performance indication, application first communication protocol setting; and the application second communication protocol setting.

A second aspect is that the processor executes the program so as to: compile a first list, from the one or more applications run by the processor, of applications that use the first wireless communication protocol and a corresponding priority indicator Wp, as the application first communication protocol setting, for each application on the list, wherein Wp=1 to m, with 1 representing a highest priority and m representing a lowest priority; compile a second list, from the one or more applications run by the processor, of applications that use the second wireless communication protocol and a corresponding priority indicator Bp, as the application second communication protocol setting, for each application on the list, wherein Bp=1 to m, with 1 representing a highest priority and n representing a lowest priority; sequentially, for each of X=1 to m: determine, based on the application performance condition, whether all applications with a Wp value less than or equal to X are performing correctly, and if not, execute a first protocol performance increase process to increase performance of the first wireless communication protocol, and if so: determine, based on the application performance condition, whether all applications with a Bp value less than or equal to X are performing correctly and if not, execute a second protocol performance increase process to increase performance of the second wireless communication protocol.

A third aspect is that the processor performs time division multiplexing between the first and second wireless communication protocols, and in executing the first protocol performance increase process, the processor: determines, based on the packet statistics, whether performance of the first wireless communication protocol is below a first predetermined level, and if so, increases an amount of time to the first wireless communication protocol in the time division multiplexing.

A fourth is that if the processor determines that performance of the first wireless communication protocol is not below the first predetermined level, the processor: determines whether the electronic apparatus has a shared antenna architecture wherein the first and second wireless communication circuits share an antenna, and if so, increases an amount of time to the first wireless communication protocol in the time division multiplexing.

A fifth aspect is that: if the processor determines that performance of the first wireless communication protocol is not below the first predetermined level, the processor determines whether the electronic apparatus has a shared antenna architecture wherein the first and second wireless communication circuits share an antenna, and if not, determines whether a currently executed coexistence mode is a parallel transmission coexistence mode; if the processor determines that the currently executed coexistence mode is the parallel transmission coexistence mode, the processor changes the coexistence mode to a hybrid coexistence mode; if the processor determines that the currently executed coexistence mode is not the parallel transmission coexistence mode, the processor determines whether the currently executed coexistence mode is the hybrid coexistence mode; if the currently executed coexistence mode is determined to be the hybrid coexistence mode, the processer executes the time division multiplexing with current time sharing settings, or preset default time sharing settings if the time division multiplexing is being executed for a first time; and if the currently executed coexistence mode is determined to not be the hybrid coexistence mode, the processor increases an amount of time to the first wireless communication protocol in the time division multiplexing.

A sixth aspect is that the processor performs time division multiplexing between the first and second wireless communication protocols, and in executing the second protocol performance increase process, the processor: determines, based on the packet statistics, whether performance of the second wireless communication protocol is below a first predetermined level, and if so, increases an amount of time to the second wireless communication protocol in the time division multiplexing.

A seventh aspect is that, if the processor determines that performance of the second wireless communication protocol is not below the first predetermined level, the processor: determines whether the electronic apparatus has a shared antenna architecture wherein the first and second wireless communication circuits share an antenna, and if so, increases an amount of time to the second wireless communication protocol in the time division multiplexing.

An eighth aspect is that: if the processor determines that performance of the second wireless communication protocol is not below the first predetermined level, the processor determines whether the electronic apparatus has a shared antenna architecture wherein the first and second wireless communication circuits share an antenna, and if not, determines whether a currently executed coexistence mode is a hybrid coexistence mode; if the processor determines that the currently executed coexistence mode is the hybrid coexistence mode, the processor changes the coexistence mode to a parallel transmission coexistence mode; if the processor determines that the currently executed coexistence mode is not the hybrid coexistence mode, the processor determines whether the currently executed coexistence mode is the parallel transmission coexistence mode; if the currently executed coexistence mode is determined to be the parallel transmission coexistence mode, the processer executes the time division multiplexing with current time sharing settings, or preset default time sharing settings if the time division multiplexing is being executed for a first time; and if the currently executed coexistence mode is determined to not be the parallel transmission coexistence mode, the processor increases an amount of time to the second wireless communication protocol in the time division multiplexing.

A ninth aspect is that the first wireless communication protocol is Wi-Fi and the second wireless communication protocol is Bluetooth.

A tenth aspect is a non-transitory computer readable medium having stored thereon a program to effect any of the above aspects.

DETAILED DESCRIPTION

Figure 1:
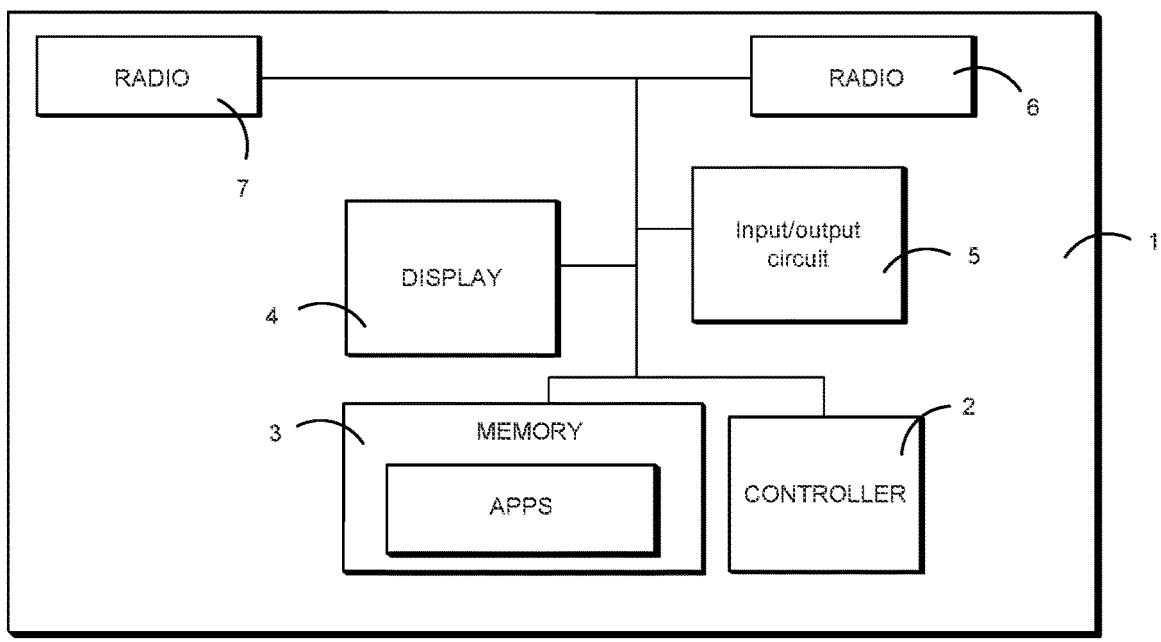
FIG. 1 is a block diagram of an example of an electronic apparatus having multiple wireless communication radios.

As shown in FIG. 1, electronic apparatus 1 includes bus lines through which various circuits are connected and communicate data with each other. A controller 2, which can include a dedicated control circuit, CPU, microprocessor (processor), etc., controls the circuits of the device, and executes programs (including applications, or "apps") stored in a memory 3. The memory 3 can include RAM as a working memory for the controller, and a non-volatile memory provided for storage of program code, software programs, apps, user audio/video content, and other data.

The electronic apparatus 1 includes an input/output circuit 5, which can include one or more connectors, such as coaxial connectors, fiber optic connectors, RF connectors, or Ethernet connectors, and/or wireless communication circuitry, such as 4G or 5G circuitry. The electronic apparatus 1 includes a first radio 6, also referred to as a first wireless communication circuit, such as a Wi-Fi WLAN interface radio transceiver. The first radio includes an antenna and communicates wirelessly via 2.4 GHz band with a bandwidth of 22 MHz and a data rate up to 150 Mbit/s. Note that the terms WLAN and Wi-Fi can be used interchangeably.

The electronic apparatus 1 also includes second radio 7, also referred to as a second wireless communication circuit, such as a Bluetooth interface radio transceiver. The second radio includes an antenna and communicates wirelessly in the ISM band, from 2.400 to 2.485 GHz. Alternatively, the first and second wireless communication circuits can share a single antenna.

As an alternative, at least one of the first and second radios can be a radio meeting a Radio Frequency For Consumer Electronics (RF4CE) protocol, zigbee protocol, and/or IEEE802.15.4 protocol, which also communicates in the ISM band.

The memory 3 has stored thereon programming executed by the controller to implement several BT/Wi-Fi co-existence modes, for example:

a) Co-existence disabled (relies on BT AFH only).
b) TDM—Time sharing, using a common antenna for both Bluetooth and Wi-Fi.
c) TDM with pre-emption—Time sharing with priority to Wi-Fi ACK packets.
d) Parallel transmission—BT and Wi-Fi communicate in parallel, which is possible when the Bluetooth antenna (antenna of radio 7) and Wi-Fi antenna (antenna of radio 6) have enough isolation from one another, or if the BT and Wi-Fi frequencies are different.
e) Hybrid.—Combination of TDM with Pre-emption and parallel transmission.

Figure 2:
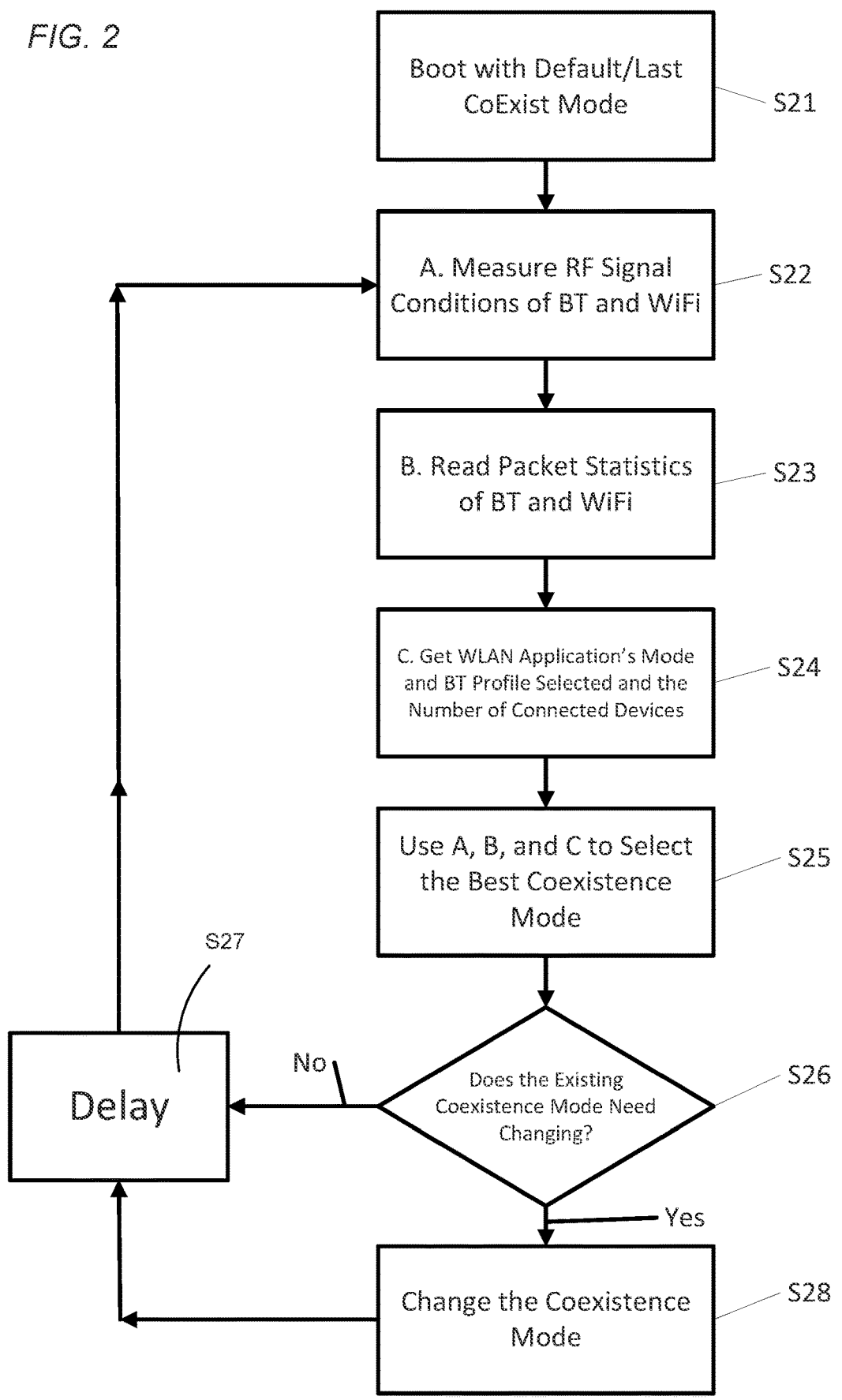
FIG. 2 is flow diagram illustrating an example of an algorithm performed by the electronic apparatus.

FIG. 2. is a flow diagram of a process performed by the controller 2 for selecting the BT/Wi-Fi co-existence mode. At step S21, at the beginning of the dynamic BT/Wi-Fi coexistence mode selection process, such as when the processor boots up, a stored default co-existence mode is selected. An identification of a particular coexistence mode can be stored in the memory as the default coexistence mode that is automatically implemented at step S21. This could be a preset coexistence mode, or could be, for example, the last coexistence mode implemented by the processor. For example, once a coexistence mode is implemented, an identification thereof is stored in the memory as the stored default coexistence mode so that the next time step S21 is run, such as at the next boot up, this last implemented coexistence mode is selected as the coexistence mode to be implemented.

At step S22, the controller 2, via the Bluetooth and Wi-Fi radios 6 and 7, collects RF signal conditions of Bluetooth and Wi-Fi signals and stores the RF diagnostics in the memory 3. The RF signal conditions include, but are not limited to, one or more of the following: RSSI; signal to noise ratio (SNR); bit error rate (BER); packet error rate (PER).

At step S23, the controller 2, via the Bluetooth and Wi-Fi radios 6 and 7, collects packet statistics of Bluetooth and Wi-Fi signals and stores the packet statistics in the memory 3. The packet statistics include, but are not limited to one or more of the following: not-acknowledged packets; number of re-transmitted packets; number of duplicate packets received (this generally occurs when an acknowledgement of receipt of a packet is sent but has not reached the transmitting side); and throughput of the received data. While step S23 is shown in FIG. 2 as being sequentially located after step S22, the step S23 can be performed before, or in parallel with, step S22.

At step S24, the controller 2 receives, from an application running on the electronic apparatus 1, communication requirement information indicating Bluetooth and/or Wi-Fi requirements of the application, and stores the communication requirement information in the memory 3. The communication requirement information can include one or more of the following: a Wi-Fi priority indication, a Bluetooth priority indication, an indication that Wi-Fi is to be prioritized over Bluetooth, and an indication that Bluetooth to be prioritized over Wi-Fi. While step S24 is shown in FIG. 2 as being sequentially located after step S23, the step S24 can be performed before, or in parallel with, step S23. Further, step S23 can be implemented at any time in response to the sending of the communication requirement information by the application. At some points the application may indicate that its Bluetooth communication is to be prioritized over its Wi-Fi communication. This can occur, for example, at times when the application is not presently sending data over WLAN, or when the rate of data consumption of the WLAN is low.

At step S25, the controller 2 uses the information stored in memory in steps S22, S23, and S24 to select one of the pre-stored BT/Wi-Fi coexistence modes. The BT/Wi-Fi coexistence mode that is selected is the one that enables Bluetooth and Wi-Fi to communicate at maximum efficiency and to provide best user's experience as-per the application needs.

In step S26, the controller 2 compares the BT/Wi-Fi coexistence mode selected in step S26 with the BT/Wi-Fi coexistence mode that is currently being implemented to determine whether the BT/Wi-Fi coexistence mode needs to be changed. If the controller 2 determines in step S26, that the selected BT/Wi-Fi coexistence mode is the same as the currently implemented BT/Wi-Fi coexistence mode and thus determines that no, the BT/Wi-Fi coexistence mode does not need to be changed, then processing proceeds to step S27, in which a delay is implemented so as to provide a predetermined amount of time to further continue to implement the currently implemented BT/Wi-Fi coexistence mode before looping back to step S22 to again execute the steps S22-S26. On the other hand, if the controller 2 determines in step S26, that the selected BT/Wi-Fi coexistence mode is not the same as the currently implemented BT/Wi-Fi coexistence mode, and thus determines that yes, the BT/Wi-Fi coexistence mode does need to be changed, then processing proceeds to step S28 in which the processor changes the BT/Wi-Fi coexistence mode to the BT/Wi-Fi coexistence mode determined in step S25. Once the BT/Wi-Fi coexistence mode is changed in step S28, processing proceeds to step S27, in which a delay is implemented so as to provide a predetermined amount of time to implement to newly implemented BT/Wi-Fi coexistence mode before looping back to step S22 to again execute the steps S22-S26.

Figure 3:
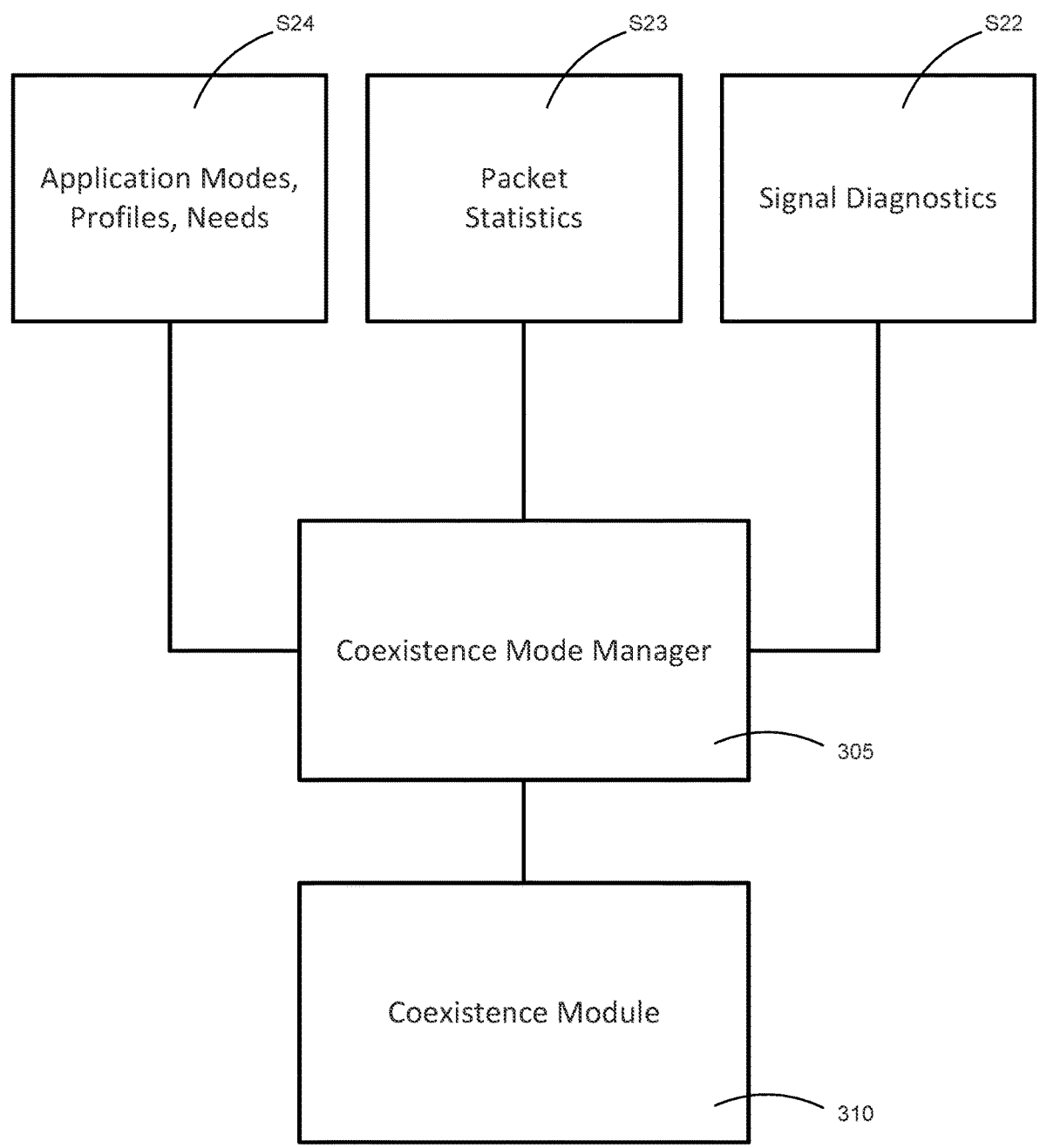
FIG. 3 is a diagram illustrating an example of inputs into a coexistence mode manager.

As shown in FIG. 3, the controller 2 executes a coexistence mode manager 305 (or the coexistence mode manager is implemented as separate circuitry, such as one or more integrated circuits). The coexistence mode manager has as inputs information gathered in steps S22, S23, and 24. The coexistence mode manager uses the information gathered in one or more of steps S22, S23, and 24, i.e., the detected signal diagnostics, packet statistics, and application modes, profiles, and application needs to select the best coexistence mode from the list of available co-existence modes stored in memory. A signal indicating the selected co-existence mode by the coexistence mode manager is used as an input in the co-existence module 310 of the electronic apparatus to set the BT/Wi-Fi coexistence mode. Co-existence manager and co-existence module can be implemented as hardware or software modules running in the same processor or different processors.

The flow charts in FIGS. 4-7 illustrate algorithms executed by the coexistence mode manager. For completeness of explanation, the algorithms address situations in which multiple applications, (e.g., applications A1 to An), are running on the electronic apparatus 1. Each of these applications may use Bluetooth and or Wi-Fi. Each application using Wi-Fi and Bluetooth is given a priority for its Bluetooth and Wi-Fi access based on its impact on providing the user the best experience using the device.

For each application A1 to An, running on the electronic apparatus 1,

Wp=Priority of the Wi-Fi access of the application, where (Wp=1, 2, . . . PriorityMin), Bp=Priority of BT access of the application, where (Bp=1, 2, . . . PriorityMin), where, an application with Wp=1 has higher priority compared to application with Wp=2, and an application with Bp=1 has higher priority compared to application with Bp=2. For example, if there are 10 applications, PriorityMin is 10, there are priorities Wp=1 through 10, with priority Wp=1 being the highest Wi-Fi priority and priority Wp=10 being the lowest Wi-Fi priority, and there are priorities Bp=1 through 10, with priority Bp=1 being the highest Bluetooth priority and priority Bp=10 being the lowest Bluetooth priority.

Figure 4:
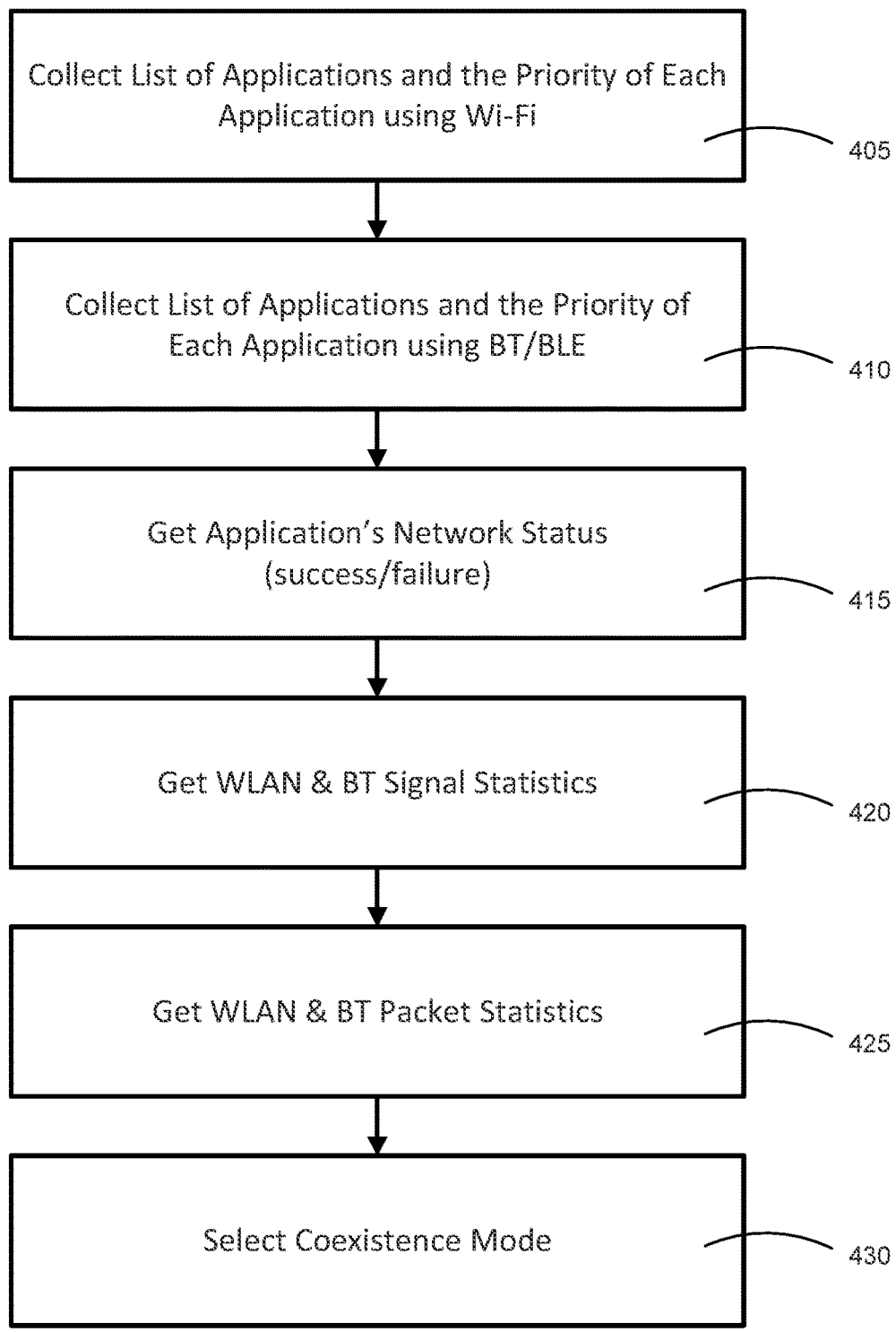
FIG. 4 is a flow diagram illustrating an example of an algorithm performed by the coexistence manger.

Co-existence manager, (implemented e.g., by the controller 2), uses the process explained in FIG. 4, whereby, as shown in step 405, it collects a list of applications that need access to WLAN (i.e., have some Wi-Fi requirement) currently running on the electronic apparatus 1, and also collects the priorities Wp of the applications in the list. The controller 2, in step 410, collects a list of applications that need access to Bluetooth (or BLE) running on the electronic apparatus 1 as well as the priorities Bp of the applications in the list. At step 415, the controller 2 collects the network statistics associated with each application in the lists. In this step, controller 2 receives information from each application indicating whether the electronic apparatus 1 has made available, for use by the application, enough band-width so that the application can operate satisfactorily. Specifically, the application provides a success/failure code to convey to the controller 2 if it can operate satisfactorily with the bandwidth allocated to it. At step 420, controller 2 collects signal statistics regarding Bluetooth operation and Wi-Fi operation, and at step 425 the controller 2 collects packet statistics from one or more Bluetooth and Wi-Fi devices communicating with the electronic device 1 vis-à-vis the applications. In some cases, it is not possible for the application to convey if it is getting enough bandwidth or time of the network resource. In such cases the data from the collected packet statistics is used by the controller 2 to determine if the application is getting enough bandwidth (or time in TDM) to operate satisfactorily. For example, a BLE (Bluetooth Low Energy) remote controller application may not know if it's getting enough bandwidth, because it does not execute continuous data transmission. However, packet statistics mentioning a loss of BLE HID data convey that a BLE HID application is not operating satisfactorily. At step 430, the controller 2 uses the collected data to select the appropriate coexistence mode. This process is further explained in FIG. 5.

Figure 5:
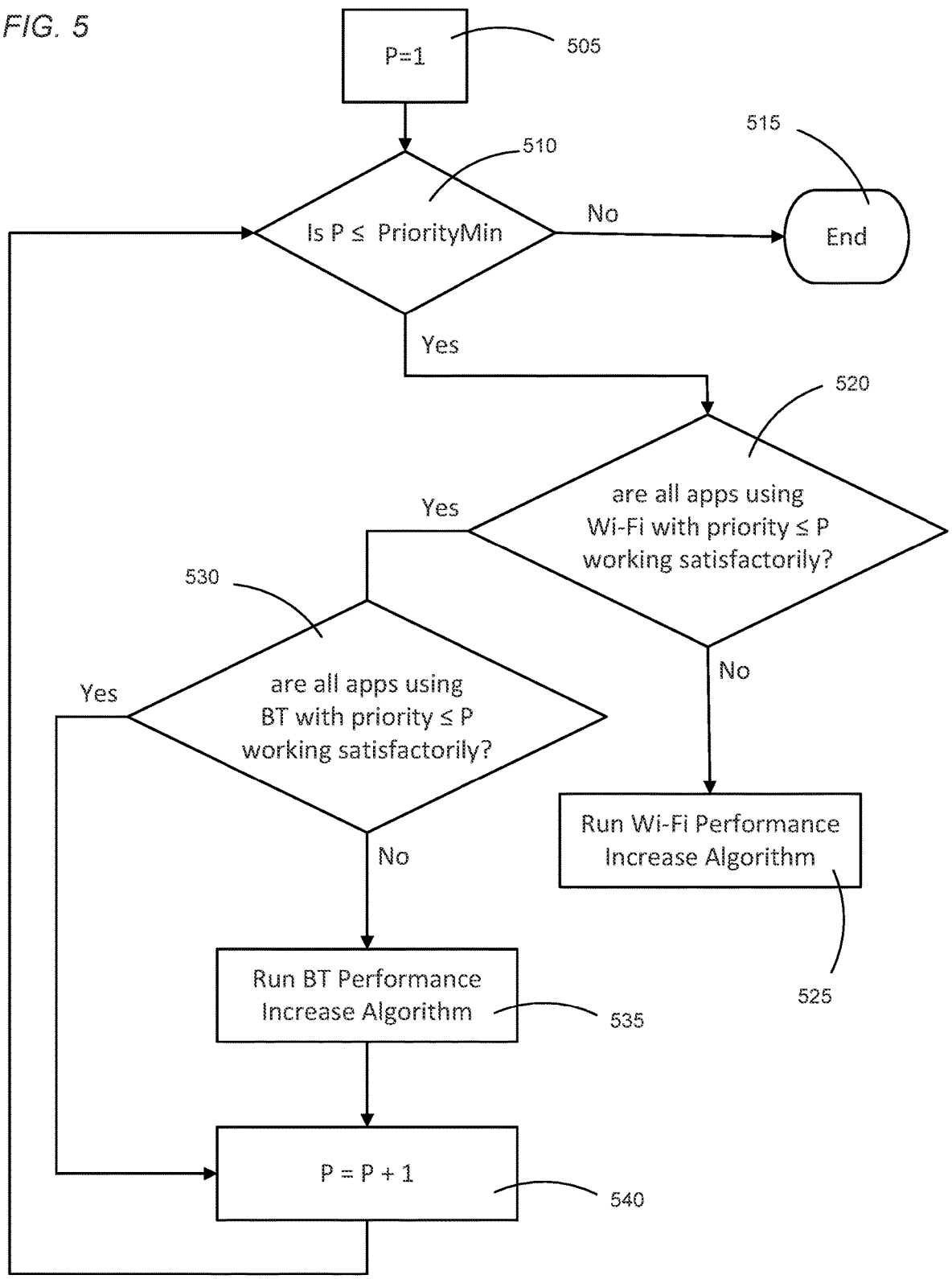
FIG. 5 is a flow diagram illustrating an example of an algorithm for determining whether Wi-Fi or Bluetooth performance is to be increased.

FIG. 5 is a flow chart illustrating an example of processing of step 430 executed by the controller 2 to select a coexistence mode from the plurality of coexistence modes. To summarize, the algorithm is designed to ensure that the application of higher priority using Bluetooth and Wi-fi are able to work satisfactorily, before the algorithm considers an application of lower priority for selecting the co-existence mode.

The process shown in FIG. 5 is executed for each of the priorities Wp and Bp, and thus the variable "P" is used to denote the value of "Wp" or "Bp". At step 505, P is set to 1. At step 510 the controller 2 determines whether P is less than or equal to PriorityMin. According the example above, where the minimum priority is 10, the controller 2 would be determining here whether P is less than or equal to 10. If P is determined to be less than or equal to PriorityMin, processing proceeds to step 520, where the controller 2 checks if all the applications using Wi-Fi are working satisfactorily. If at step 520, a decision is made that all the apps using Wi-Fi and having Wp priorities less than or equal to P are working satisfactorily, then the process proceeds to step 530, where a decision is made that all the apps using Bluetooth and having Bp priorities less than or equal to P are working satisfactorily. For example, if the processing is occurring for P=3, then the controller determines that applications with Wp of 1, 2, and 3, and applications with Bp of 1, 2, and 3, are operating satisfactorily. If at step 530, the applications using Bluetooth are also found to be able to work satisfactorily, then the process moves to 540, where the controller 2 selects the application (or applications) that has the next lower priority, i.e., P is incremented by one (P=P+1) and runs the loop again starting from step 510. By iterations then, the algorithm moves down the priority, (e.g. for all of P 1-10), such that all applications with higher priority are considered while selecting the coexistence mode. Once P is determined in step 510 to not be less than or equal to PriorityMin (e.g., once P reaches 11 when PriorityMin is 10, processing proceeds to step 515 where it ends.

If the controller 2 determines at step 520 that an application having priority higher than or equal to Wp (e.g., if P is 3, applications with priority Wp=1, 2, or 3) is not running properly, processing proceeds to step 525 where the controller 2 runs a program to increase Wi-Fi performance, discussed below. Likewise, if the controller 2 determines at step 530 that an application having priority higher than or equal to Bp (e.g., if P is 3, applications with priority Bp=1, 2, or 3) is not running properly, processing proceeds to step 535 where the controller 2 runs a program to increase Bluetooth performance, discussed below.

Figure 6:
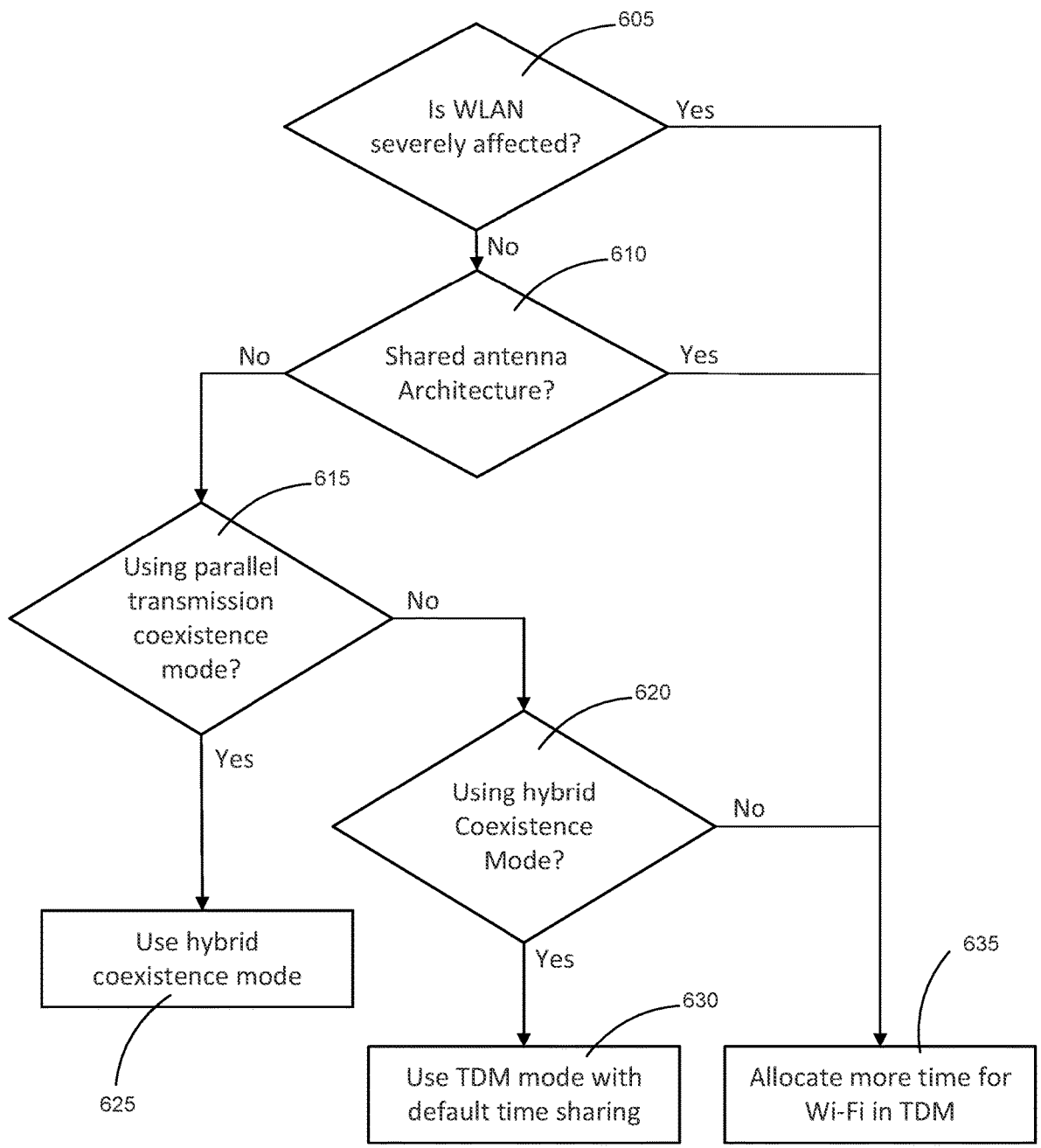
FIG. 6 is a flow diagram illustrating an example of a Wi-Fi performance increase algorithm.

FIG. 6 illustrates an example of a Wi-Fi performance increase algorithm of step 525 of FIG. 5. At step 605 the controller 2 checks if WLAN is severely affected, i.e., if the performance of the WLAN is below a predetermined level. WLAN being severely affected or below a predetermined level is described by, for example: WLAN RSSI <−80 dBm, and/or PER>10%, and/or BER>0.1%, and/or SNR<SNR threshold for the Wi-Fi standard.

If at step 605 the controller 2 determines that the WLAN is not below a predetermined level (e.g., that the WLAN RSSI is not below −80 dBm), then the process proceeds to step 610, where the controller 2 checks if the architecture of the device is a shared antenna mode, wherein the BT and Wi-Fi radios 6 and 7 share the same antenna (this information may be stored in the memory 3). If at step 610 the controller 2 determines that the device does not use a shared antenna architecture, then the process proceeds to step 615, where the controller 2 checks if the current co-existence mode is the Parallel Coexistence Mode. In Parallel Coexistence Mode, Bluetooth and Wi-Fi operate independently and therefore Wi-Fi performance is at risk of being affected while Bluetooth is operating, and vice versa. If at step 615 the controller 2 determines that the currently in effect coexistence mode is the Parallel Coexistence Mode, then the process moves to step 625 where the controller 2 selects the Hybrid Coexistence Mode. If at step 615 the controller 2 determines that the currently in effect coexistence mode is not the Parallel Coexistence Mode, then process proceeds to step 620 where the controller 2 checks if the currently in effect coexistence mode is the Hybrid Coexistence Mode. If at step 620, the controller 2 determines that the currently in effect coexistence mode is the Hybrid Coexistence Mode, then the process moves to step 630 where the controller 2 selects the TDM (time division multiplexing) Coexistence Mode. If the TDM Coexistence Mode is being selected for the first time, it is implemented with a default time sharing scheme between Wi-Fi and BT. The default time sharing scheme is configurable. If the value is not provided by the user, the default time sharing scheme is set at, for example, 50% for Wi-Fi and 50% for Bluetooth.

If at step 620 the controller 2 determines that the currently in effect coexistence mode is not the Hybrid Coexistence Mode, or if at step 610 the controller 2 determines that the electronic apparats 1 has a shared antenna architecture, or if at step 605 the controller 2 determines that WLAN is severely affected, then process proceeds to step 635 where the controller 2 increments the time share of Wi-Fi in the TDM. The step size is chosen such that it provides enough space for Wi-Fi performance to be improved but at the same time does not overly detriment Bluetooth performance to a point of causing applications to not perform satisfactorily. For example, the increment value may be a 10% increase of the Wi-Fi TDM share.

Figure 7:
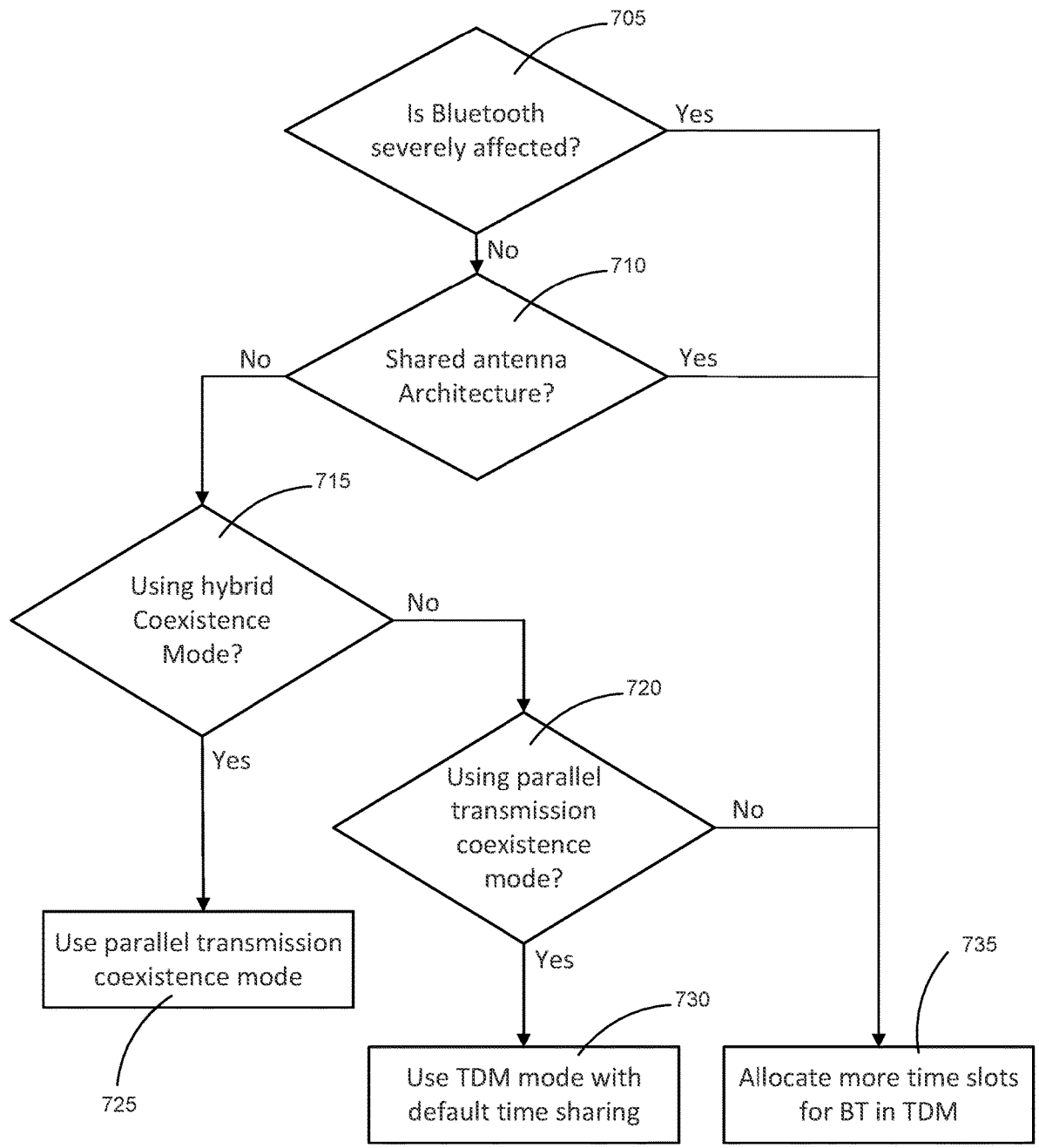
FIG. 7 is a flow diagram illustrating an example of a Bluetooth performance increase algorithm.

FIG. 7 illustrates an example of a Bluetooth performance increase algorithm of step 535 of FIG. 5. At step 705 the controller 2 checks if Bluetooth is severely affected or below a predetermined level. Bluetooth being severely affected or below a predetermined level is described by, for example: Bluetooth RSSI<−60 dBm, and/or PER>10%, and/or BER>0.1%, and/or SNR<SNR threshold for Basic Data Rate/LE.

If at step 705 the controller 2 determines that the Bluetooth is not below a predetermined level, (e.g., that the Bluetooth RSSI is not below −60 dBm), then the process proceeds to step 710, where the controller 2 checks if the architecture of the device is a shared antenna mode, where the BT and Wi-Fi radios 6 and 7 share the same antenna (this information may be stored in the memory 3). If at step 710 the controller 2 determines that the device does not use a shared antenna architecture, then the process proceeds to step 715, where the controller 2 checks if the current co-existence mode is Hybrid Coexistence Mode. If at step 715 the controller 2 determines that the currently in effect coexistence mode is the Hybrid Coexistence Mode, then the process moves to step 725 where the controller 2 selects the Parallel Coexistence Mode. In Parallel Coexistence Mode, Bluetooth and Wi-Fi operate independently and therefore Wi-Fi performance is at risk of being affected while Bluetooth is operating and vice versa. If at step 715 the controller 2 determines that the currently in effect coexistence mode is not the Hybrid Coexistence Mode, then process proceeds to step 720 where the controller 2 checks if the currently in effect coexistence mode is the Parallel Transmission Coexistence Mode. If at step 720, the controller 2 determines that the currently in effect coexistence mode is the Parallel Transmission Coexistence Mode, then the process moves to step 730 where the controller 2 selects the TDM (time division multiplexing) Coexistence Mode. If the TDM Coexistence Mode is being selected for the first time, it is implemented with a default time sharing scheme between Wi-Fi and BT. The default time sharing scheme is configurable. If the value is not provided by the user, the default time sharing scheme is set at, for example, 50% for Wi-Fi and 50% for Bluetooth.

If at step 720 the controller 2 determines that the currently in effect coexistence mode is not the Parallel Transmission Coexistence Mode, or if at step 710 the controller 2 determines that the electronic apparatus 1 has a shared antenna architecture, or if at step 605 the controller 2 determines that Bluetooth is severely affected, then process proceeds to step 735 where the controller 2 increments the time share of Bluetooth in the TDM. The step size is chosen such that it provides enough space for Bluetooth performance to be improved but at the same time does not overly detriment Wi-Fi performance to a point of causing applications to not perform satisfactorily. For example, the increment value may be a 10% increase of the Bluetooth TDM share.

If at any point while running process in FIG. 4, when trying to improve the performance of applications using Bluetooth, if it is seen that the performance of application using Wi-Fi is affected or vice versa, there is a danger that the algorithm could end up in an indefinite loop. In order to avoid such an indefinite loop, a proper stop condition is needed. To implement the stop condition, the controller 2 checks if at any point applications of all higher priority are working satisfactorily. If any optimization for priority Px is found to affect the performance of applications of P(x−1) ... Px−y where x−y=1, then the algorithm aborts and continues to use the coexistence mode selected in the last iteration using Px−1. Also, when there is conflict between BT and Wi-Fi for applications of the same priority, where the algorithm would otherwise end up in an indefinite loop, the Bluetooth application is given higher priority over Wi-Fi and the application aborts.

The above is an example of processing for implementing the coexistence mode manager. Contemplated herein are modifications to the above, or use of various data types (discussed below) to determine whether Bluetooth or Wi-Fi performance is below a predetermined level, or applications are working satisfactorily, which would be considered obvious to those having ordinary skill in the art in light of the following information.

PER (packet error rate)=(error Packets/total packets). This gives the rate of packets errors which can be used as a measure to evaluate the channel reception condition.

SNR (Signal to noise ratio)=Difference between the signal level and the noise level. SNR represents the amount of noise and thus the difficulty in receiving data.

Throughput=WLAN throughput/BT throughput. WLAN throughput and drop of throughput provides data of changing channel conditions.

Packet statistics=Packet statistics such as 'not-acknowledged' packets, number of duplicate packets received, give the exact statistics of the RF channel condition. Using these to select the co-existence mode gives accurate results.

Application requirement=Applications (electronic device) may not use Bluetooth at times and at such times, priority is provided to WLAN communication. Some blue tooth modes (HID) may not require constant transmission during which priority can be given to WLAN. And when Wi-Fi is not used, BT can take priority based on the demand and need from the application.

Examples of how each of the parameter can be used to select the best co-ex mode:

RSSI (Received Signal Strength Indicator):

If Wi-Fi RSSI is poor, then the controller 2 can give Wi-Fi more time in case of TDM. Also it may be beneficial on a case by case basis to stop BT data communication during Wi-Fi data communication.

If BT RSSI is poor, then the controller 2 can give BT separate time slots or frequencies instead of using spatial multiplexing as the received BT signal can be affected by the transmitted Wi-Fi Signal.

BER (Bit error rate)=(error bits/total bits), PER (packet error rate)=(error Packets/total packets):

BER and PER provide statistics of the number of received bits and packets which are erroneous. These statistics can be used as a measure to evaluate the channel reception conditions (i.e., whether Wi-Fi or Bluetooth is performing above or below a predetermined level). These 2 measures can be used in place of RSSI where possible.

If Wi-Fi BER/PER is poor, then it is an indication that the signal reception condition is worse (or getting worse) and thus the controller 2 can use Wi-Fi MCS (Modulate Coding Scheme) to select the best MCS rate which is suitable for the signal condition. Even after selecting the best MCS if Wi-Fi suffers, then the controller 2 can choose a different frequency for Wi-Fi, and to change the BT channel hopping sequence. Alternatively, the controller 2 can switch off Bluetooth in case of using a separate antenna for Bluetooth to allow Wi-Fi to transmit with the least interference. Similarly, if BT BER/PER is poor, then the controller 2 can allocate or switch some Wi-Fi time/frequencies to Bluetooth until Bluetooth reception statistics get better.

SNR (Signal to noise ratio)=Difference between the signal level and the noise level. SNR represents the amount of noise and thus the difficulty in receiving data. SNR data is an indication to proactively change the coexistence scheme. For example, if SNR of Bluetooth is low and it reaches a limit beyond which it is known that Bluetooth performance of applications will suffer, then without waiting for loss of data, the controller 2 can allocate more time slots to Bluetooth, or the Bluetooth hopping sequence can be changed, or the controller can switch off Wi-Fi during Bluetooth operation.

Throughput=WLAN throughput/BT throughput. WLAN throughput and drop of throughput provides data of changing channel conditions. In noisy signal conditions, throughput reduces as there are loss of data. Throughput can be calculated at transmission or reception and based on throughput, decision on which coexistence mode to use can be made. For example, if WLAN throughput is dropping well below the minimum requirement, then the controller can switch off Bluetooth during Wi-Fi usage to help WLAN throughput improve.

Similarly if Bluetooth is used to stream audio to the customer's headphones that is being downloaded from internet through Wi-Fi and if Bluetooth suffers because of Wi-Fi's interference, then the end goal of streaming audio to the customer fails, and even though the audio is being successfully downloaded through Wi-Fi, it is of no use because the customer cannot hear the audio due to the fact that Wi-Fi interference has stopped the successful Bluetooth transmission/reception. In such cases, the controller 2 can detect the Bluetooth throughput and ensure that a minimum Bluetooth throughput is achieved so that the user's experience is not affected.

Packet statistics=Packet statistics such as 'not-acked' packets, number of duplicate packets received, give the exact statistics of the RF channel condition. Using these to select the co-existence mode gives accurate results. Not-Acked packet statistics give a good indication that the receiver and the transmitter are not able to communicate with each other. If the performance of Wi-Fi is suffering (or the performance of applications using Wi-Fi is not satisfactory), then the controller 2 can back-off Bluetooth (e.g., via TDM) in order to provide more time for Wi-Fi to transmit.

Application requirement=Applications (electronic device) may not use Bluetooth at times and at such times, priority is provided to WLAN communication. Some blue tooth modes (HID) may not require constant transmission during which priority can be given to WLAN. And when Wi-Fi is not used, Bluetooth can take priority based on the demand and need from the application. For example, for a Bluetooth remote, if the user presses a key once, then chances are high that he is going to use the remote again soon and thus the controller 2 can give more slots/time to the remote application to use the Bluetooth channel.

For example, when watching a video being streamed from Wi-Fi and using Bluetooth to transfer a photo file and using Bluetooth RCU, priority is the following order:

1) BT remote
2) Wi-Fi video downloading
3) BT Photo sharing.

In similar way, all the applications using Bluetooth and Wi-Fi can be given priorities. These priorities can be programmed by the device vendor and allowing the user to change the priority based on his preference.

The present invention can be implemented not only as an apparatus or apparatuses, but also as a method including the steps conducted by the electronic devices as discussed above, which methods as discussed above constitute examples of algorithms. The invention can also be implemented as a program on a non-transitory computer-readable medium for causing a computer, such as a processor in an electronic apparatus, to execute such steps. The non-transitory computer-readable recording medium could be, for example, a CD-ROM, DVD, Blu-ray disc, or an electronic memory device.

The present invention may be implemented as any combination of a system, a method, an integrated circuit, and a computer program on a non-transitory computer readable recording medium.

The control circuit and any other parts of the electronic apparatuses may be implemented as Integrated Circuits (IC), Application-Specific Integrated Circuits (ASIC), or Large Scale Integrated circuits (LSI), system LSI, super LSI, or ultra LSI components which perform a part or all of the functions of the electronic apparatuses, such as set-top boxes. Each of the parts of the present invention can be implemented using many single-function components, or can be one component integrated using the technologies described above. The circuits may also be implemented as a specifically programmed general purpose processor, CPU, a specialized microprocessor such as Digital Signal Processor that can be directed by program instructions on a memory, a Field Programmable Gate Array (FPGA) that can be programmed after manufacturing, or a reconfigurable processor. Some or all of the functions may be implemented by such a processor while some or all of the functions may be implemented by circuitry in any of the forms discussed above.

The present invention may be a non-transitory computer-readable recording medium having recorded thereon a program embodying the methods/algorithms discussed above for instructing a processor to perform the methods/algorithms.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory.

The sequence of the steps included in the above described algorithms is exemplary, and algorithms having a sequence other than the above described sequences are contemplated. Moreover, steps, or parts of the algorithm, may be implemented simultaneously or in parallel.

The components of the present invention can be in the form of a set-top box, or in other standalone devices, or may be incorporated in a television or other content playing apparatus, or other device or appliance, and the scope of the present invention is not intended to be limited on such forms.

It is also contemplated that the implementation of the components of the present invention can be done with any newly arising technology that may replace any of the above implementation technologies.

We claim:

1. An electronic apparatus comprising:
one or more antennas;
a first wireless communication circuit that effects wireless communication according to a first communication protocol over one of the one or more antennas;
a second wireless communication circuit that effects wireless communication according to a second communication protocol over one of the one or more antennas;
a memory having a program, and coding for plural coexistence modes stored therein, each coexistence mode when executed enabling coexistence of wireless communication according to the first and second wireless communication protocols by the first and second wireless communication circuits; and
a processor that runs one or more applications, and executes the program so as to:
collect wireless signal conditions of signals received with the first and second wireless communication circuits, respectively;
determine packet statistics of communication packets received with the first and second wireless communication circuits;
obtain, for each application being run by the processor, an application performance indication, an application first communication protocol setting and an application second communication protocol setting; and
determine which one of the coexistence modes to execute based on the wireless signal conditions, the packet statistics, the application performance indication, application first communication protocol setting, and the application second communication protocol setting.

2. The electronic apparatus according to claim 1, wherein the processor executes the program so as to:
compile a first list, from the one or more applications run by the processor, of applications that use the first wireless communication protocol and a corresponding priority indicator Wp, as the application first communication protocol setting, for each application on the list, wherein Wp=1 to m, with 1 representing a highest priority and m representing a lowest priority;
compile a second list, from the one or more applications run by the processor, of applications that use the second wireless communication protocol and a corresponding priority indicator Bp, as the application second communication protocol setting, for each application on the list, wherein Bp=1 to m, with 1 representing a highest priority and n representing a lowest priority;
sequentially, for each of X=1 to m:
determine, based on the application performance condition, whether all applications with a Wp value less than or equal to X are performing correctly, and if not, execute a first protocol performance increase process to increase performance of the first wireless communication protocol, and if so:
determine, based on the application performance condition, whether all applications with a Bp value less than or equal to X are performing correctly and if not, execute a second protocol performance increase process to increase performance of the second wireless communication protocol.

3. The electronic apparatus according to claim 2, wherein the processor performs time division multiplexing between the first and second wireless communication protocols, and in executing the first protocol performance increase process, the processor:
  determines, based on the packet statistics, whether performance of the first wireless communication protocol is below a first predetermined level, and if so, increases an amount of time to the first wireless communication protocol in the time division multiplexing.

4. The electronic apparatus according to claim 3, wherein, if the processor determines that performance of the first wireless communication protocol is not below the first predetermined level, the processor:
  determines whether the electronic apparatus has a shared antenna architecture wherein the first and second wireless communication circuits share an antenna, and if so, increases an amount of time to the first wireless communication protocol in the time division multiplexing.

5. The electronic apparatus according to claim 3, wherein:
  if the processor determines that performance of the first wireless communication protocol is not below the first predetermined level, the processor determines whether the electronic apparatus has a shared antenna architecture wherein the first and second wireless communication circuits share an antenna, and if not, determines whether a currently executed coexistence mode is a parallel transmission coexistence mode;
  if the processor determines that the currently executed coexistence mode is the parallel transmission coexistence mode, the processor changes the coexistence mode to a hybrid coexistence mode;
  if the processor determines that the currently executed coexistence mode is not the parallel transmission coexistence mode, the processor determines whether the currently executed coexistence mode is the hybrid coexistence mode;
  if the currently executed coexistence mode is determined to be the hybrid coexistence mode, the processer executes the time division multiplexing with current time sharing settings, or preset default time sharing settings if the time division multiplexing is being executed for a first time; and
  if the currently executed coexistence mode is determined to not be the hybrid coexistence mode, the processor increases an amount of time to the first wireless communication protocol in the time division multiplexing.

6. The electronic apparatus according to claim 2, wherein the processor performs time division multiplexing between the first and second wireless communication protocols, and in executing the second protocol performance increase process, the processor:
  determines, based on the packet statistics, whether performance of the second wireless communication protocol is below a first predetermined level, and if so, increases an amount of time to the second wireless communication protocol in the time division multiplexing.

7. The electronic apparatus according to claim 6, wherein, if the processor determines that performance of the second wireless communication protocol is not below the first predetermined level, the processor:
  determines whether the electronic apparatus has a shared antenna architecture wherein the first and second wireless communication circuits share an antenna, and if so, increases an amount of time to the second wireless communication protocol in the time division multiplexing.

8. The electronic apparatus according to claim 6, wherein:
  if the processor determines that performance of the second wireless communication protocol is not below the first predetermined level, the processor determines whether the electronic apparatus has a shared antenna architecture wherein the first and second wireless communication circuits share an antenna, and if not, determines whether a currently executed coexistence mode is a hybrid coexistence mode;
  if the processor determines that the currently executed coexistence mode is the hybrid coexistence mode, the processor changes the coexistence mode to a parallel transmission coexistence mode;
  if the processor determines that the currently executed coexistence mode is not the hybrid coexistence mode, the processor determines whether the currently executed coexistence mode is the parallel transmission coexistence mode;
  if the currently executed coexistence mode is determined to be the parallel transmission coexistence mode, the processer executes the time division multiplexing with current time sharing settings, or preset default time sharing settings if the time division multiplexing is being executed for a first time; and
  if the currently executed coexistence mode is determined to not be the parallel transmission coexistence mode, the processor increases an amount of time to the second wireless communication protocol in the time division multiplexing.

9. The electronic apparatus according to claim 1, wherein the first wireless communication protocol is Wi-Fi and the second wireless communication protocol is Bluetooth.

10. A method for determining which of a plurality of coexistence modes to execute with a processor, wherein the processor selectively runs one or more applications, and wherein each coexistence mode when executed enables coexistence of wireless communication according to first and second wireless communication protocols, said method comprising, executing a program with the processor so as to:
  collect wireless signal conditions of signals received with the first and second wireless communication protocols, respectively;
  determine packet statistics of communication packets received with the first and second wireless communication protocols, respectively;
  obtain, for each application being run by the processor, an application performance indication, an application first communication protocol setting; and an application second communication protocol setting; and
  determine which one of the coexistence modes to execute based on the wireless signal conditions, the packet statistics, the application performance indication, application first communication protocol setting; and the application second communication protocol setting.

11. The method according to claim 10, comprising, further executing the program with the processor so as to:
  compile a first list, from the one or more applications run by the processor, of applications that use the first wireless communication protocol and a corresponding priority indicator Wp, as the application first communication protocol setting, for each application on the list, wherein Wp=1 to m, with 1 representing a highest priority and m representing a lowest priority;

compile a second list, from the one or more applications run by the processor, of applications that use the second wireless communication protocol and a corresponding priority indicator Bp, as the application second communication protocol setting, for each application on the list, wherein Bp=1 to m, with 1 representing a highest priority and n representing a lowest priority;

sequentially, for each of X=1 to m:

determine whether all applications with a Wp value less than or equal to X are performing correctly, and if not, execute a first protocol performance increase process to increase performance of the first wireless communication protocol, and if so:

determine whether all applications with a Bp value less than or equal to X are performing correctly, and if not, execute a second protocol performance increase process to increase performance of the second wireless communication protocol.

12. The method according to claim 11, wherein the processor performs time division multiplexing between the first and second wireless communication protocols, the method further comprising, in executing the first protocol performance increase process, determining, with the processor, based on the packet statistics, whether performance of the first wireless communication protocol is below a first predetermined level, and if so, increases an amount of time to the first wireless communication protocol in the time division multiplexing.

13. The method according to claim 12, further comprising, if the processor determines that performance of the first wireless communication protocol is not below the first predetermined level, determining, with the processor, whether a shared antenna architecture is being implemented, and if so, increasing an amount of time to the first wireless communication protocol in the time division multiplexing.

14. The method according to claim 12, further comprising:
if the processor determines that performance of the first wireless communication protocol is not below the first predetermined level, determining, with the processor, whether a shared antenna architecture is being implemented, and if not, determining whether a currently executed coexistence mode is a parallel transmission coexistence mode;
if the processor determines that the currently executed coexistence mode is the parallel transmission coexistence mode, changing, with the processor, the coexistence mode to a hybrid coexistence mode;
if the processor determines that the currently executed coexistence mode is not the parallel transmission coexistence mode, determining, with the processor, whether the currently executed coexistence mode is the hybrid coexistence mode;
if the currently executed coexistence mode is determined to be the hybrid coexistence mode, executing, with the processer, the time division multiplexing with current time sharing settings, or preset default time sharing settings if the time division multiplexing is being executed for a first time; and
if the currently executed coexistence mode is determined to not be the hybrid coexistence mode, increasing, with the processor, an amount of time to the first wireless communication protocol in the time division multiplexing.

15. The method according to claim 11, wherein the processor performs time division multiplexing between the first and second wireless communication protocols, the method further comprising, in executing the second protocol performance increase process, determining, with the processor, based on the packet statistics, whether performance of the second wireless communication protocol is below a first predetermined level, and if so, increasing an amount of time to the second wireless communication protocol in the time division multiplexing.

16. The method according to claim 15, further comprising:
if the processor determines that performance of the second wireless communication protocol is not below the first predetermined level, determining, with the processor whether a shared antenna architecture is being implemented, and if so, increasing an amount of time to the second wireless communication protocol in the time division multiplexing.

17. The method according to claim 15, further comprising:
if the processor determines that performance of the second wireless communication protocol is not below the first predetermined level, determining, with the processor, whether a shared antenna architecture is being implemented, and if not, determining whether a currently executed coexistence mode is a hybrid coexistence mode;
if the processor determines that the currently executed coexistence mode is the hybrid coexistence mode, changing, with the processor, the coexistence mode to a parallel transmission coexistence mode;
if the processor determines that the currently executed coexistence mode is not the hybrid coexistence mode, determining, with the processor whether the currently executed coexistence mode is the parallel transmission coexistence mode;
if the currently executed coexistence mode is determined to be the parallel transmission coexistence mode, executing, with the processer, the time division multiplexing with current time sharing settings, or preset default time sharing settings if the time division multiplexing is being executed for a first time; and
if the currently executed coexistence mode is determined to not be the parallel transmission coexistence mode, increasing, with the processor, an amount of time to the second wireless communication protocol in the time division multiplexing.

18. The electronic apparatus according to claim 10, wherein the first wireless communication protocol is Wi-Fi and the second wireless communication protocol is Bluetooth.

19. A non-transitory computer readable medium having stored thereon a program for determining which of a plurality of coexistence modes to execute with a processor, wherein the processor selectively runs one or more applications, and wherein each coexistence mode when executed enables coexistence of wireless communication according to first and second wireless communication protocols, the program causing the processor to at least:
collect wireless signal conditions of signals received with the first and second wireless communication protocols, respectively;
determine packet statistics of communication packets received with the first and second wireless communication protocols, respectively;
obtain, for each application being run by the processor, an application performance indication, an application first communication protocol setting; and an application second communication protocol setting; and determine which one of the coexistence modes to execute based on the wireless signal conditions, the packet statistics, the application performance indication, application first communication protocol setting; and the application second communication protocol setting.

* * * * *